(12) United States Patent
Zanchi (10) Patent No.: US 12,264,980 B2
(45) Date of Patent: Apr. 1, 2025

(54) STRESS SENSOR AND METHODS OF OPERATING SAME

(71) Applicant: The Boeing Company, Chicago, IL (US)

(72) Inventor: Alfio Zanchi, Huntington Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/454,947

(22) Filed: Nov. 15, 2021

(65) Prior Publication Data

US 2022/0196493 A1   Jun. 23, 2022

Related U.S. Application Data

(60) Provisional application No. 63/126,900, filed on Dec. 17, 2020.

(51) Int. Cl.
*G01L 1/22* (2006.01)
*G01L 5/1627* (2020.01)

(52) U.S. Cl.
CPC .......... *G01L 1/2262* (2013.01); *G01L 5/1627* (2020.01)

(58) Field of Classification Search
CPC ................... G01L 1/2262; G01L 5/1627
See application file for complete search history.

(56) References Cited

U.S. PATENT DOCUMENTS 3,453,536 A * 7/1969 Lode ....................... G01L 1/225
324/706
3,544,891 A * 12/1970 Gerhard ............... H03H 7/0153
29/620

(Continued)

FOREIGN PATENT DOCUMENTS

| JP | 2011153931 | * | 8/2011 | ............... F01N 3/02 |
| JP | 2013022110 | * | 2/2013 | ............. D04B 47/04 |
| JP | 2013022110 A | | 2/2013 | |

OTHER PUBLICATIONS

Extended European Search Report issued in application serial No. 21214959.5 dated May 4, 2022; pp. 1-7.

(Continued)

*Primary Examiner* — Alexander Satanovsky
*Assistant Examiner* — Sharah Zaab
(74) *Attorney, Agent, or Firm* — Alleman Hall & Tuttle LLP (57) ABSTRACT

A stress sensor is provided, including a substrate and a bridge circuit disposed thereon. The bridge circuit is coupled between an output node and a ground node. The bridge circuit includes a first and second branch, the first branch having a first resistor coupled to a tunable resistor at a first intermediate node. The second branch has a second resistor coupled to a variable reference resistor of value Rref at a second intermediate node, wherein the variable reference resistor is configured to sweep through a plurality of discrete values Rref. The bridge circuit also includes an amplifier having a positive input terminal coupled to the first intermediate node and a negative input terminal coupled to the second intermediate node. The amplifier is configured to generate a digital voltage output at the output node as a function of the mechanical stress applied to the substrate and of the value Rref.

22 Claims, 5 Drawing Sheets

(56) References Cited

U.S. PATENT DOCUMENTS

| 5,481,905 | A | * | 1/1996 | Pratt | G01P 15/12 |
|---|---|---|---|---|---|
| | | | | | 73/900 |
| 10,704,969 | B2 | | 7/2020 | Zanchi | |
| 2002/0092364 | A1 | * | 7/2002 | Adderton | B60C 11/00 |
| | | | | | 73/862.41 |
| 2016/0344327 | A1 | * | 11/2016 | Lopez | H02P 25/034 |
| 2017/0027058 | A1 | * | 1/2017 | Perkins | H01L 23/60 |
| 2017/0123548 | A1 | * | 5/2017 | Shih | G01L 1/22 |

OTHER PUBLICATIONS

Lee, Mitchell, Understanding and Applying Voltage References, Linear Technology, Nov. 1999, Application Note 82, pp. AN82-1-AN82-12.

Garcia-Bardon, M. et al., Layout-induced stress effects in 14 nm and 10nm FinFETs and their impact on performance, 2013 Symposium on VLSI Technology Digest of Technical Papers, pp. T114-T115.

Mian, Ahsan et al., The van der Pauw Stress Sensor, IEEE Sensors Journal, Apr. 2006, vol. 6, No. 2, pp. 340-356.

Practical Strain Gage Measurements, Hewlett Packard, Application Note AN290-1, Sep. 1981, pp. 1-30.

* cited by examiner

STRESS SENSOR AND METHODS OF OPERATING SAME

CROSS REFERENCE TO RELATED APPLICATIONS

This application claims priority to U.S. Provisional Patent Application No. 63/126,900 filed Dec. 17, 2020 titled Stress Sensor and Methods of Operating Same, the entire contents of which are hereby incorporated herein by reference.

BACKGROUND

The field of the disclosure relates generally to stress sensors, and, more specifically, to a stress sensor including a bridge circuit configured for stress monitoring and methods of operating the same.

Many electrical systems are implemented in or include electronic circuits fabricated on semiconductor wafers, including, for example, and without limitation, silicon wafers. The processing and packaging of semiconductor wafers sometimes introduces mechanical stress on the dice cut from the wafers themselves, due to the sawing operation itself or the subsequent molding process to enclose the dice inside a package. Such stresses may impact performance of the electrical system, its circuits and its structures. For example, post-packaging stress has a notable effect on the precision of analog-to-digital converters, digital-to-analog converters, and voltage reference circuits. Such stresses may further impact the carrier mobility in transistors implemented on the wafer. Accordingly, stress sensors are often incorporated into electronic circuits to characterize mechanical stresses that act on the larger circuit, or system on a chip (SoC).

It is desirable to have simple stress sensors that (1) are accurately and easily read, and (2) provide high sensitivity, high resolution, and improved stability.

BRIEF DESCRIPTION

According to one aspect of the present disclosure, a stress sensor circuit is provided. The stress sensor circuit includes a substrate configured to be subjected to mechanical stress, and a bridge circuit disposed on the substrate and coupled between an output node and a ground node. The bridge circuit includes a first branch having a first resistor of value R1, wherein the first resistor is coupled to a tunable resistor of value R at a first intermediate node. The bridge circuit also includes a second branch having a second resistor of value R2, wherein the second resistor is coupled to a variable reference resistor of value Rref at a second intermediate node, wherein the variable reference resistor is configured to sweep through a plurality of discrete values Rref. The bridge circuit further includes an amplifier having a positive input terminal coupled to the first intermediate node, and a negative input terminal coupled to the second intermediate node. The amplifier is configured to generate the digital voltage output at the output node as a function of the mechanical stress applied to the substrate and of the value Rref.

According to yet another aspect of the present disclosure, a method of measuring mechanical stress on a substrate is provided. The method includes supplying a voltage supply to a bridge circuit coupled between an output node and ground. The bridge circuit includes a first branch having a first resistor of value R1, wherein the first resistor is coupled to a tunable resistor of value R, and a second branch having a second resistor of value R2, wherein the second resistor is coupled to a variable reference resistor of value Rref. The method also includes varying the value Rref by sweeping the variable reference resistor through a plurality of discrete values Rref, and reading a digital voltage output at the output node that varies as a function of the mechanical stress and of the value Rref.

According to a further aspect of the present disclosure, a stress sensor system is provided. The system includes a substrate configured to be subjected to mechanical stress and a bridge circuit disposed on the substrate and coupled between an output node and a ground node. The bridge circuit includes a first branch having a first resistor of value R1, wherein the first resistor is coupled to a tunable resistor of value R at a first intermediate node, and a second branch having a second resistor of value R2, wherein the second resistor is coupled to a variable reference resistor of value Rref at a second intermediate node. The bridge circuit also includes an amplifier having a positive input terminal coupled to the first intermediate node, and a negative input terminal coupled to the second intermediate node. The amplifier is configured to generate the digital voltage output at the output node as a function of the mechanical stress applied to the substrate and of the value Rref. The system also includes a microprocessor coupled to the variable reference resistor and to the output node. The microprocessor is configured to control the variable reference resistor to sweep through a plurality of discrete values Rref, and read the digital output at the output node.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and preceded by the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Embodiments of the stress sensors described herein provide a bridge circuit similar in structure to certain precision voltage reference (PVR) circuits, such as the PVR circuits described in U.S. Pat. No. 9,405,305, titled "Precision Voltage Reference Circuit with Tunable Resistance," assigned to The Boeing Company, of Chicago, Illinois, which is hereby incorporated herein by reference in its entirety, or the stress sensor circuits described in U.S. Pat. No. 10,704,969, titled "Stress Sensor," assigned to The Boeing Company, of Chicago, Illinois, which is hereby incorporated herein by reference in its entirety. Such PVR circuits are typically designed to provide a voltage output that is stable under varying age, temperature variation, and radiation events. Such precision is critical, because even small shifts in the voltage reference translate to errors in acceleration, position, and rotation. Some vehicles, for example, such as long-range guided vehicles, including intercontinental missiles and space vehicles, use inertial pendulum-based navigation systems, gyroscopic-based navigation systems, or some combination of both to satisfy their low tolerance for error in precision and accuracy.

The systems and methods of the present disclosure improve the stability and resolution of stress sensors, such that the outputs therefrom are particularly resilient to undesirable variations of temperature, supply, frequency, and other environmental variables. One resistive element of the stress sensor is digitally driven between toggle thresholds, at which the voltage output from the stress sensor switches, or toggles, between high and low outputs (e.g., a high output referred to as "1", and a low output referred to as "0"). The disclosed systems and methods capitalize on the hysteretic nature of these stress sensors and on the advantages of averaging to facilitate the identification, with high-resolution, of a digital representation of these toggle threshold values. These advantages are realized without requiring an ADC within the stress sensor. The systems and methods of the present disclosure further rely on the voltage output characteristics of the stress sensor as further described herein, which effectively mimics a digital output such that the output can be directly supplied to a digital device (e.g., a microcontroller, microprocessor, field-programmable gate array (FPGA), etc.).

Stress sensors described herein may be also embodied on semiconductor wafers integrated into larger mechanical structures, where the mechanical strains of the larger mechanical structures are tightly coupled to the mechanical strains of the semiconductor wafers themselves. Such embodiments enable micro-scale monitoring of local stresses on the larger mechanical structures. Embodiments of the stress sensors described herein provide greater sensitivity, simpler implementation, and easier operation, e.g., simpler and more accurate digital readout.

Figure 1:
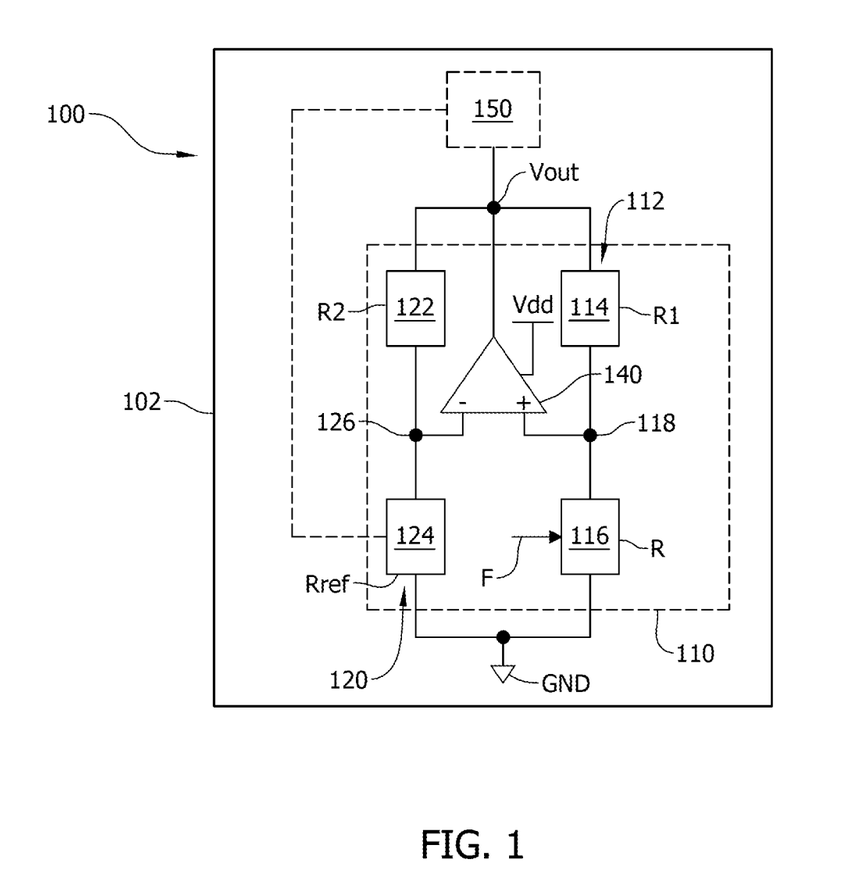
FIG. 1 is a schematic diagram of one embodiment of a stress sensor circuit.

FIG. 1 is a schematic diagram of one embodiment of a stress sensor circuit 100 disposed on a substrate 102. Stress sensor circuit 100 includes a bridge circuit 110 coupled between an output node, Vout, and a ground node, GND. The output node and an output voltage present on the output node are interchangeably referred to herein as Vout. Bridge circuit 110 includes a first branch 112, sometimes referred to as a tuning branch, having a resistor 114 of value R1 and another resistor 116 of value R. Within first branch 112, between resistors 114 and 116, is a first intermediate node 118. Bridge circuit 110 also includes a second branch 120, sometimes referred to as a variable branch, having a resistor 122 of value R2 and a variable reference resistor 124 of value Rref. Within second branch 120, between resistors 122 and 124, is a second intermediate node 126. In certain embodiments, resistors 114 and 122 in the first and second branches 112 and 120, respectively, and resistor 124 are precision resistors, making them temperature-stable and radiation-stable. In certain embodiments, resistors 114 and 122 have a same value, whereas in other embodiments, resistors 114 and 122 have a different value. Moreover, although resistors 114 and 122 are shown as having a same orientation, in some embodiments, resistor 122 is oriented substantially orthogonal to resistor 114.

Bridge circuit 110 also includes an amplifier 140 coupled as a bridge between first intermediate node 118 and second intermediate node 126. Amplifier 140 is supplied a voltage, Vdd. Amplifier 140 includes a positive input terminal coupled to first intermediate node 118 and a negative input terminal coupled to second intermediate node 126. Amplifier 140 also includes an output terminal coupled to Vout. In certain embodiments, amplifier 140 includes a plurality of metal-oxide semiconductor field effect transistors (MOSFETs), making amplifier 140 temperature-stable and radiation-stable.

During operation, Vout is divided by first branch 112 and second branch 120 based on values R1 and R, and values R2 and Rref, respectively. A voltage Vb presents at first intermediate node 118 and a voltage Va presents at second intermediate node 126. The divider formed by second branch 120 is relatively linear, i.e., Va is linear with respect to Vout. In certain embodiments, such as in PVR circuits, the divider formed by first branch 112 is preferably substantially non-linear based on the implementation of resistor 116 and its value R, i.e., Vb is substantially non-linear with respect to Vout. Such an arrangement makes the PVR circuit output less sensitive with respect to variations in resistive values R1, R2, and Rref. In other embodiments of bridge circuits described herein, the divider formed by first branch 112 is preferably more linear (e.g., only slightly non-linear) based on the implementation of resistor 116 to yield greater and more abrupt sensitivity of Vout as relative resistive values R1, R2, and Rref shift relative to each other due, for example, to mechanical stresses.

Amplifier 140 operates as a linear high-gain error amplifier and generates Vout, which is fed back to the branches, serving as a self-reference for bridge circuit 110. Self-referencing of bridge circuit 110 using amplifier 140 substantially eliminates supply dependence and provides a closed-loop convergence once a startup voltage is applied via a startup circuit (not shown). The startup circuit activates the loop, for example, by raising the voltage Va at second intermediate node 126 upon power-on. Amplifier 140 is supplied by a largely non-regulated voltage supply and can be implemented with a power supply rejection (PSR) of at least 100 dB. Furthermore, amplifier 140 operates in the forward path of the closed-loop, which reduces and/or minimizes the impact of its own shifts, e.g., versus temperature and radiation over the stability of the bridge.

In one embodiment of stress sensor circuit, the value R (R=1/CF) of resistor 116 is held quasi-constant. This is accomplished by tuning frequency F to a constant value, capacitance C to a constant value, and relying on small residual non-linearities of parasitic elements (such as junction capacitors of semiconductor switches forming a switched-capacitor equivalent resistor 116, as shown, for instance, in U.S. Pat. No. 10,704,969) to provide an equilibrium of the intermediate nodes of the bridge, and subsequently of the circuit as a whole, including its output (Vout). In this way, stress sensor circuit 100 is relatively more sensitive to changes in R1, R2, or the differential therebetween. When any of these values change, Vout experiences a relative abrupt change from a high output to a low output (e.g., from a high output set as "1" to a low output set as "0"). In some cases, it can be difficult to tune resistor R to the desired initial state such that stress sensor circuit 100 is optimally sensitive. Moreover, various environmental factors such as temperature, aging, supply and frequency change between the time of initialization of stress sensor circuit 100 and the time of readout therefrom. In such cases, either false triggers or missed triggers of the sensor output may occur.

Figure 2:
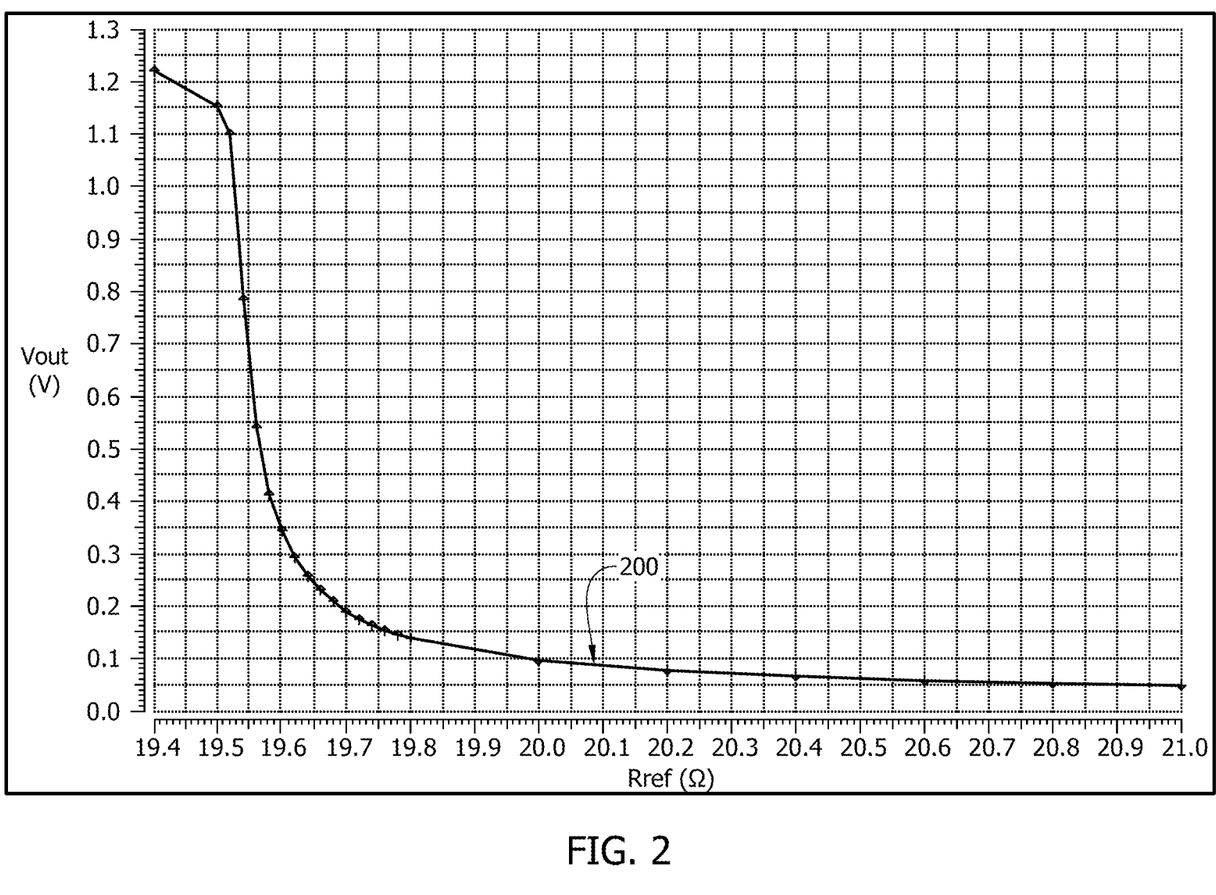
FIG. 2 is a graph of exemplary digital voltage output response to resistive value shifts within the stress sensor circuit shown in FIG. 1.

In accordance with the present disclosure, it is realized that first branch 112, through amplifier 140, exhibits at least some degree of positive feedback. Specifically, when Vout is the high output, this voltage output contributes to an accordingly higher voltage at the positive terminal of amplifier 140 as a result of the voltage division between resistor 114 and resistor 116, and vice versa. In the exemplary embodiment, amplifier 140 exhibits a steep voltage output shift in response to a change in values R1 or R2 (or the differential therebetween), from the high output to the low output. This voltage output shift is graphically depicted in FIG. 2 with voltage output curve 200. It is therefore further realized that by varying the resistive value of one of the resistive elements of bridge circuit 110—specifically, the value Rref of resistor 124—Vout can be driven to toggle or switch between the high output and the low output, and between the low output and the high output. A consequence of the positive feedback behavior is also the hysteretic nature of the sensor loop (e.g., first branch 112 looped around amplifier 140 is functionally equivalent to a tunable hysteretic comparator, or tunable Schmitt trigger), which exhibits opposite output toggle thresholds (during upward and downward resistive value sweeps) that are not coincident, but rather occur at two different values of the resistive element being varied: specifically, the value Rref of resistor 124. Therefore, the voltage output behavior depicted in FIG. 2 is repeated with two different toggle thresholds: once for an up-swinging resistive ramp stimulus, and once for a down-swinging resistive ramp stimulus (see also FIG. 3, as described further herein).

By varying Rref, as described further herein, between a range of values including the toggle threshold values of bridge circuit 110, while all other elements are unchanged and environmental conditions are kept as uniform as practical, toggling of the voltage output can be elicited, and, consequently, these toggle thresholds can be readily identified. By iteratively driving Rref through this range of values, both in increasing and decreasing sweeps, a statistical distribution of the values of Rref (or, equally, of its driving parameter) at which an output level toggling of Vout occurs (from the high output to the low output, and from the low output to the high output) can be acquired. From the statistical distributions, averaging can be performed, enabling the system to possess the advantages of readout stability and noise filtering known of averaging techniques. In particular, the upward and downward digital "sweep" of discrete Rref values that cause Vout to switch can be repeated to accumulate more statistical confidence about the precise location of the sensor's transition points, even in the presence of random noise.

Rref is iteratively (i) increased from a minimum value of Rref to a maximum value of Rref, through a high toggle threshold, at which voltage Vout switches from the high output to the low output, and (ii) decreased from the maximum to the minimum value of Rref, through a low toggle threshold, at which voltage Vout switches from the low output to the high output. The hysteretic differential voltage response of Vout to variations of Rref, as described further herein, is depicted in graph 300 shown in FIG. 3. The horizontal axis is resistance (e.g., the value of Rref), and the vertical axis is voltage (e.g., the voltage output Vout). In particular, Vout is selectively switched between a high output (Vref+, e.g., "1") and a low output (Vref−, e.g., "0"), by varying Rref. As Rref is driven from the minimum value to the maximum value, Vout traverses output curve 302, and the hysteretic comparator differential input proportionally varies from β·Vref− to β·Vref+. When Rref reaches the high toggle threshold (e.g., at 306), output curve 302 reflects the transition of Vout from Vref+ to Vref−. Likewise, as Rref is driven from the maximum value to the minimum value, Vout traverses output curve 304, and the hysteretic comparator differential input proportionally varies from β·Vref+ back to β·Vref−. When Rref reaches the low toggle threshold (e.g., at 308), output curves 304 reflects the transition of Vout from Vref− to Vref+. In this embodiment, the coefficient β=R(Vref)/[R1+R(Vref)], where R is determined by clock frequency F and fixed capacitance C, as described above. Additionally, the maximum and minimum values of Rref are predetermined and selected above and below, respectively, the high and low toggle threshold values (e.g., by some predefined margin that enables distinguishing between the actual threshold value and noise).

In the exemplary embodiment, resistor 124 is embodied as a digitally controlled potentiometer or R-DAC, and may be referred to herein as "R-DAC 124". R-DAC 124 varies the value Rref using digital codes, also referred to as digital "words," each representing a unique resistance value (e.g., a combination of internal resistors applied in series). In the exemplary embodiment, R-DAC 124 accommodates digital words that are at least 8-bit long. In one particular embodiment, R-DAC 124 includes a 2.51Ω digital potentiometer with an 8-bit interface that provides a resolution of 2.5Ω/256=9.8Ω per LSB (Least Significant Bit), which translates into an equivalent sensing resolution of bridge circuit 110. From this data, an equivalent minimum detectable stress amount (expressed, for example, as a pressure, in kPa) can be calculated.

In some embodiments, R-DAC 124 is controllable via the interface by a digital device 150, such as a microcontroller, microprocessor, DSP, FPGA, or the like. Digital device 150 is coupled to R-DAC 124 in a manner enabling communication between digital device 140 and R-DAC 124. Digital device 150 includes a digital memory register suitable for controlling R-DAC 124 (e.g., for storing digital words which R-DAC 124 uses to vary the value Rref). Additionally or alternatively, digital device 150 reads and records each digital word controlling Rref from R-DAC 124. In addition, digital device 150 reads Vout at the output node of amplifier 140. Digital device 150 therefore is configured to read and record the digital word fed to R-DAC 124 controlling Rref (equivalently, the value of Rref) at which Vout switches from the high output (e.g., 1) to the low output (e.g., 0), and from the low output to the high output. Digital device 150 identifies these values of Rref as the corresponding digital words fed to R-DAC 124 when the digital output voltage of the sensor is toggled and records those values of Rref as the high and low toggle thresholds, respectively.

Figure 3:
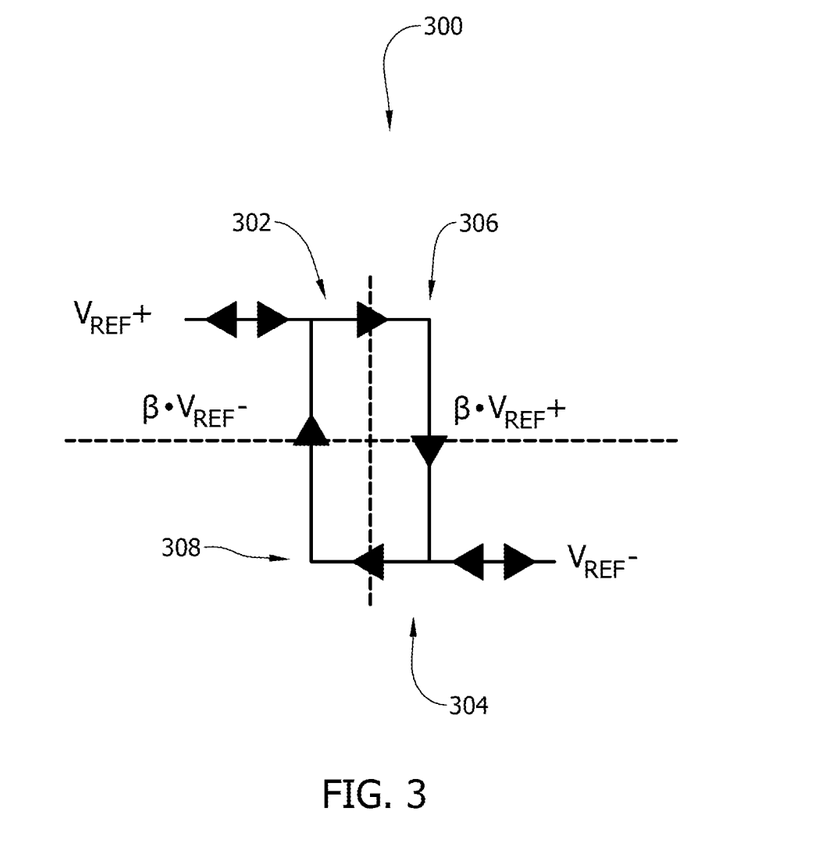
FIG. 3 is a graph of exemplary digital voltage output response to controlled variation in a reference resistance value within the stress sensor circuit shown in FIG. 1.

Notably, the characteristic responses of Vout, as depicted in graph 300, from high output to low output and from low output to high output, are analog states, but they are sufficiently abrupt as to be distinguishable and read directly by digital device 150. Therefore, as described above, Vout can be considered functionally equivalent to a digital output. This digital output is directly obtained, using bridge circuit 110, without any signal pre-conditioning and without requiring any additional comparator. The resultant bridge circuit 110 of the present disclosure therefore can be characterized as including a digital input (e.g., the digital word used by R-DAC 124) and a digital output (e.g., the Vout level read directly by digital device 150).

It should be readily understood that the high and low voltage values, while generally referred as high or "1" output and a low or "0" output, are dependent upon the particular structure of bridge circuit 110 and upon the values of the various resistive elements therein, as well as the properties of amplifier 140. For example, in one particular embodiment, the high output is between 1.0 V and 1.2 V, and the low output is between 0.2 V and 0.4 V. However, the present disclosure is suitably generalized to provide a high-resolution Vout such that the difference between the high and low outputs is easily distinguishable due to the abruptness of the shift therebetween (e.g., at the toggle thresholds of Rref). Moreover, given its substantially digital characteristic, bridge circuit 110 exhibits relatively high noise immunity.

The value Rref (which may be represented by the digital word issued to R-DAC 124 to control the value Rref, when a transition of Vout is detected at digital device 150, is affected by thermal noise and other effects that, when random in nature, can be interpreted as inherent "dither." This dither can be advantageously used to increase the resolution of stress sensor circuit 100. In some embodiments, artificial (e.g., digital) dither is purposely introduced during operation of stress sensor circuit 100. In some such embodiments, this digital dither is introduced in the form of random binary noise generated via a PRNG (Pseudo-Random Number Generator) circuit (not shown). Because the transition values of Vout are each a DC constant value, and the variable under observation is naturally slow, simple low-pass filtering of this artificial noise can be performed (e.g., using very long averaging), thereby rejecting most of the noise and isolating the values of interest. In one particular embodiment, a fine dither is introduced, in the form of a digital potentiometer in parallel or in series to resistor Rref. This additional digital potentiometer is modulated by a random digital word that widens the range of the toggle thresholds beyond 1 LSB of the original digital resolution of R-DAC 124. Coupled with averaging techniques, this methodology facilitates identifying the precise toggle threshold values Rref (represented by a unique digital word fed to R-DAC 124).

It is realized that this methodology for effectively digitizing stress sensor circuit 100 is, like previous stress sensors, somewhat vulnerable to circuit age and changes in environmental conditions (e.g., temperature). These variations may affect the toggle threshold values Rref, randomly or systematically. In some implementations, for instance, the toggle threshold value Rref shifts by as much as 4-6 LSBs due to changes in clock frequency F, applied voltage Vdd, and/or temperature. These shifts can result in false-positive triggers of stress sensor circuit 100, or, alternatively, can be significant enough to mask the changes in mechanical stress that are meant to be detected by stress sensor circuit 100.

It is an advantageous realization in accordance with the present disclosure that both the high and low toggle threshold values of Rref are similarly influenced by these conditions. Therefore, by recording the digital word representations of the high and low toggle thresholds of Rref, digital device 150 is configured to calculate the differential therebetween. That is, digital device 150 records the high toggle threshold during an upward Rref sweep, as Rref is increased in an upward count from a minimum value to a maximum value, when digital device 150 detects the transition in Vout from the high output to the low output. Likewise, digital device 150 records the low toggle threshold during a subsequent downward Rref sweep, as Rref is decreased in a downward count from the maximum value to the minimum value, when digital device 150 detects the transition in Vout from the low output to the high output. Digital device 150 calculates the difference between the high toggle threshold and the low toggle threshold, referred to as the differential readout. In one exemplary implementation, the differential readout shifts only up to 2 LSBs in response to wide variations in clock frequency F, applied voltage Vdd, and/or temperature, in contrast to the greater shifts in the absolute toggle threshold values, as described above.

The differential readout, therefore, exhibits improved stability and reliability over the absolute toggle threshold values. In turn, a more precise operation of stress sensor circuit 100 is facilitated, while reducing sensitivity to environmental/aging conditions. The same benefits of averaging, described above herein with respect to the absolute toggle threshold values of Rref, can likewise be applied to the differential readout. In particular, the upward and downward sweeps can be iterated any number of times, while introducing noise and/or other parameter variation or exploiting the noise/variation naturally occurring in the system, to increase the resolution of the differential readout of the sensor.

Accordingly, stress sensor circuit 100 is a high-sensitivity "resistance to digital converter (RDC)" circuit, able to measure with much greater resolution the movement of resistors 114 and 122 (or the differential therebetween).

Figure 4:
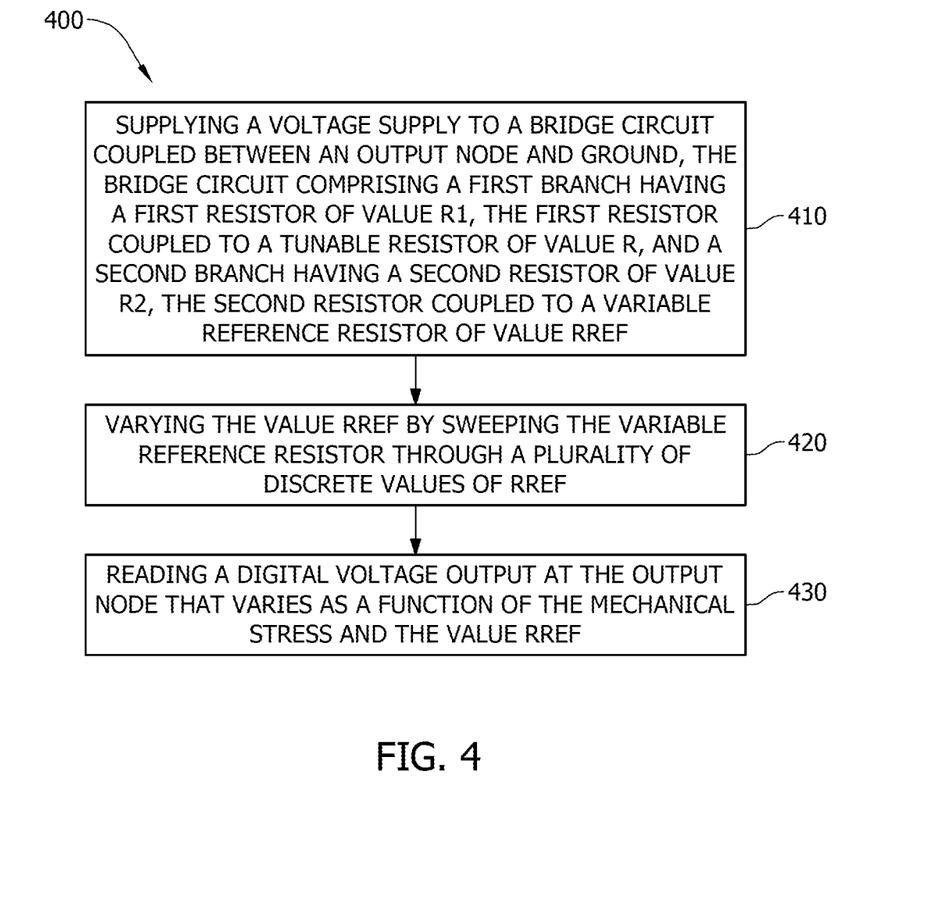
FIG. 4 is a flow diagram of one embodiment of a method of measuring mechanical stress on a substrate.

FIG. 4 is a flow diagram of one embodiment of a method 400 of measuring mechanical stress on substrate 102, on which bridge circuit 110 is disposed. A voltage supply is supplied 410 to bridge circuit 110, which is coupled between an output node, Vout, and a ground node, GND. Bridge circuit 110 includes resistor 114 (having value R1), tunable resistor 116 (having value R), resistor 122 (having value R2), and variable reference resistor 124 (having variable value Rref). The equilibrium point and output node voltage of bridge circuit vary as a function of the mechanical stress to which substrate 102 is subjected.

The value Rref is varied 420 by sweeping the variable reference resistor through a plurality of discrete values of Rref, and the digital voltage output at the output node is read 430, where the digital output varies as a function of the mechanical stress on substrate 102 and of the value Rref.

Figure 5:
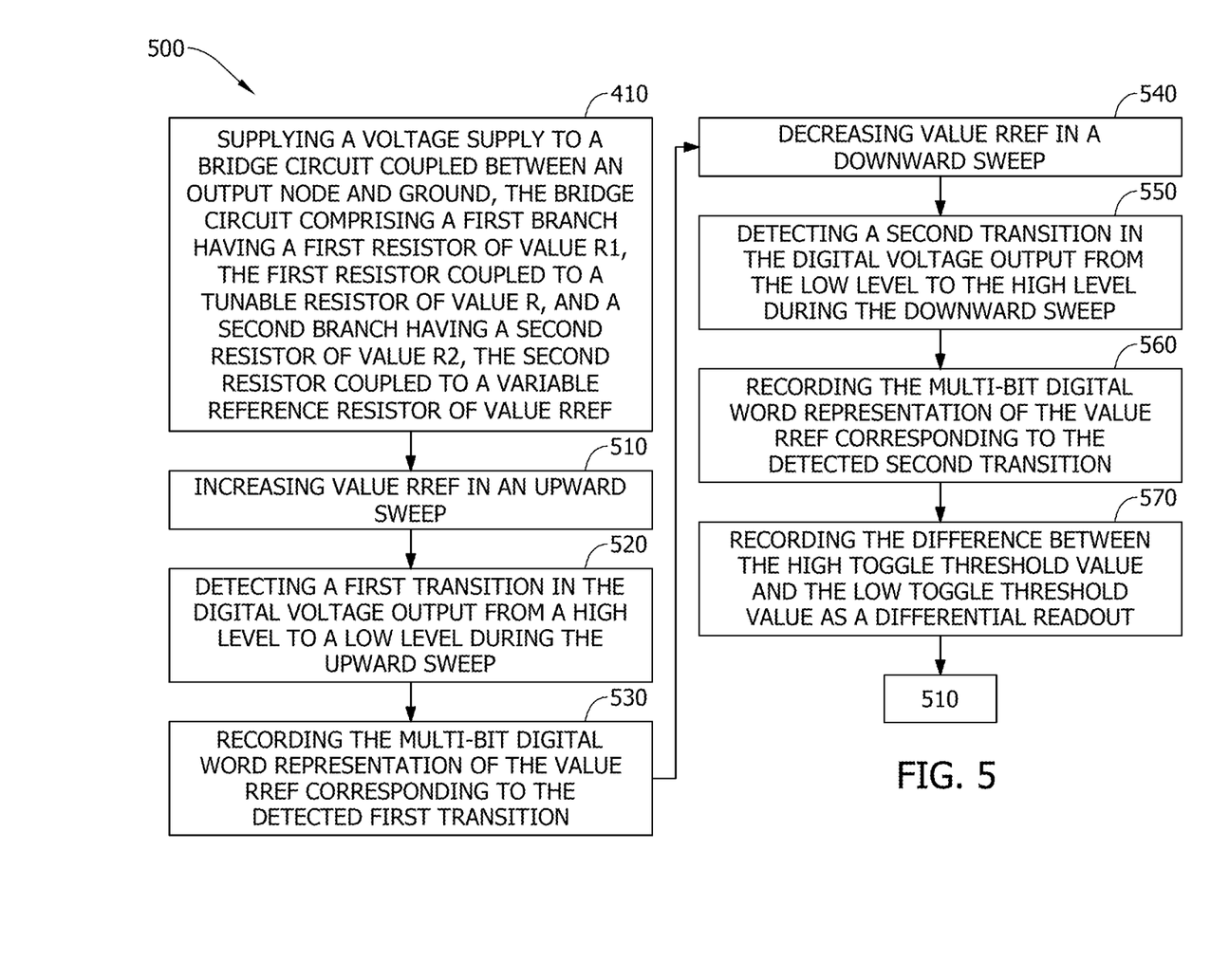
FIG. 5 is a flow diagram of another embodiment of a method of measuring mechanical stress on a substrate.

Method 400 may include additional, fewer, and/or alternative steps. For example, FIG. 5 depicts a flow diagram of another embodiment of another method 500 of measuring mechanical stress on substrate 102, including steps 410, 420, and 430 as described above, as well as additional steps. In particular, the value Rref is varied (420) by increasing 510 the value Rref (e.g., by R-DAC 124) in an upward sweep from a first value to a second value. Each value may include a multi-bit digital word (e.g., an 8-bit or greater digital word). The digital voltage at the output node is read (430) by detecting 520 (e.g., by digital device 150) a first transition in the digital voltage output from a high level to a low level during the upward sweep. The multi-bit digital word representation of the value Rref corresponding to the detected first transition is recorded 530 (e.g., by digital device 150) as a high toggle threshold value.

Thereafter, the value Rref is varied (420) by decreasing 540 the value Rref (e.g., by R-DAC 124) in a downward sweep from the second value to the first value. The digital voltage at the output node is read (430) by detecting 550 (e.g., by digital device 150) a second transition in the digital voltage output from the low level to the high level during the downward sweep. The multi-bit digital word representation of the value Rref corresponding to the detected second transition is recorded 560 (e.g., by digital device 150) as a low toggle threshold value.

A difference between the high toggle threshold value and the low toggle threshold value is recorded 570 (e.g., by digital device 150) as a differential readout. This method 500 can be iterated numerous times, as described herein.

In one embodiment, method 400 or method 500 includes introducing artificial noise to the stress sensor circuit during any or all of the steps thereof, and recording an effect of the artificial noise on the differential readout (e.g., after appropriate filtering).

An exemplary technical effect of the methods, systems, and apparatus described herein includes at least one of: (a) improving sensitivity and stability of a stress sensor circuit relative to known sensing circuits; (b) applying the benefits of averaging to increase the resolution of the digital readout from the sensor; and (c) achieving these benefits without requiring an ADC.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, which include the best mode, to enable persons skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stress sensor circuit operable to generate a digital voltage output, the stress sensor circuit comprising:
    a substrate configured to be subjected to mechanical stress; and
    a bridge circuit disposed on the substrate and coupled between an output node of the bridge circuit and a ground node, the bridge circuit comprising:
        a first branch having a first resistor of value R1, wherein the first resistor is coupled to a tunable resistor of value R at a first intermediate node;
        a second branch having a second resistor of value R2, wherein the second resistor is coupled to a variable reference resistor of value Rref at a second intermediate node, and wherein the variable reference resistor is controlled to sweep through a plurality of discrete values Rref; and
        an amplifier having a positive input terminal coupled to the first intermediate node, and a negative input terminal coupled to the second intermediate node, wherein the amplifier is configured to generate the digital voltage output at the output node as a function of the mechanical stress applied to the substrate and of the value Rref,
    wherein the variable reference resistor is controlled to sweep through the plurality of discrete values Rref by increasing the value of Rref in an upward sweep from a first value to a second value and by decreasing the value Rref in a downward sweep from the second value to the first value so as toggle an output level of the digital voltage output, and
    wherein the bridge circuit is self-referenced so that the digital voltage output is fed back to the first and second branches at the output node.

2. The stress sensor circuit of claim 1, wherein the variable reference resistor is a digital potentiometer or an R-DAC and is configured to digitally control the value Rref.

3. The stress sensor circuit of claim 2, wherein the variable reference resistor has a resolution of at least 8-bit.

4. The stress sensor circuit of claim 1, further comprising a digital device coupled to the output node and configured to read the digital voltage output at the output node.

5. The stress sensor circuit of claim 4, wherein the variable reference resistor is an R-DAC configured to digitally control the value Rref in the upward sweep from the first value to the second value and the downward sweep from the second value to the first value.

6. The stress sensor circuit of claim 5, wherein the digital device is further configured to detect a first transition in the digital voltage output from a high level to a low level during the upward sweep and a second transition in the digital voltage output from the low level to the high level during the downward sweep.

7. The stress sensor circuit of claim 6, wherein the digital device is further configured to record a digital word representation of the value Rref corresponding to the detected first transition as a high toggle threshold value and a digital word representation of the value Rref corresponding to the detected second transition as a low toggle threshold value.

8. The stress sensor circuit of claim 7, wherein the digital device is further configured to record a difference between the high toggle threshold value and the low toggle threshold value as a differential readout.

9. The stress sensor circuit of claim 8, wherein the R-DAC is further configured to digitally control the value Rref in a plurality of iterated upward and downward sweeps, and wherein the digital device is further configured to record a respective differential readout for each pair of upward and downward sweeps in the plurality of iterated upward and downward sweeps.

10. The stress sensor circuit of claim 7, wherein the first value Rref is greater than or equal to the high toggle threshold value and the second value Rref is less than or equal to the low toggle threshold value.

11. The stress sensor circuit of claim 5, wherein the digital device includes a digital memory register configured to control the R-DAC to determine each value of Rref.

12. A method of measuring mechanical stress on a substrate, the method comprising:
    supplying a voltage supply to an amplifier of a bridge circuit coupled between an output node of the bridge circuit and ground, the bridge circuit comprising:
        a first branch having a first resistor of value R1, wherein the first resistor is coupled to a tunable resistor of value R; and
        a second branch having a second resistor of value R2, wherein the second resistor is coupled to a variable reference resistor of value Rref;
    controlling the value Rref by sweeping the variable reference resistor through a plurality of discrete values Rref; and
    reading a digital voltage output by the amplifier at the output node that varies as a function of the mechanical stress and of the value Rref, wherein the variable reference resistor is controlled to sweep through the plurality of discrete values Rref by increasing the value of Rref in an upward sweep from a first value to a second value and by decreasing the value Rref in a subsequent downward sweep from the second value to the first value so as toggle an output level of the digital voltage output, and wherein the bridge circuit is self-referenced so that the digital voltage output is fed back to the first and second branches at the output node.

13. The method of claim 12, wherein, in controlling the variable reference resistor to sweep through the plurality of discrete values Rref, the value Rref is iteratively i) increased in the upward sweep from the first value to the second value, and ii) decreased in the subsequent downward sweep from the second value to the first value so as toggle the output level of the digital voltage output, and wherein the method further comprises:

generating a statistical distribution of the value of Rref at which the output level of the digital voltage output toggles from a high output to a low output, and from the low output to the high output; and averaging, using the statistical distribution, transition points from the high output to the low output and transition points from the low output to the high output.

14. The method of claim 12, wherein said reading the digital voltage output comprises:

detecting a first transition in the digital voltage output from a high level to a low level during the upward sweep; and detecting a second transition in the digital voltage output from the low level to the high level during the downward sweep.

15. The method of claim 14, further comprising:

recording a digital word representation of the value Rref corresponding to the detected first transition as a high toggle threshold value; and recording a digital word representation of the value Rref corresponding to the detected second transition as a low toggle threshold value.

16. The method of claim 15, further comprising recording a difference between the high toggle threshold value and the low toggle threshold value as a differential readout.

17. The method of claim 16, further comprising:

introducing artificial noise into the bridge circuit; and recording an effect of the artificial noise on the differential readout.

18. The method of claim 16, further comprising:

increasing and decreasing the value Rref in a plurality of iterated upward and downward sweeps; and recording a respective differential readout for each pair of upward and downward sweeps in the plurality of iterated upward and downward sweeps.

19. The method of claim 12, further comprising coupling a digital device between the variable reference resistor and the output node, wherein the digital device is configured to perform said controlling and said reading.

20. A stress sensor system comprising:

a substrate configured to be subjected to mechanical stress;

a bridge circuit disposed on the substrate and coupled between an output node of the bridge circuit and a ground node, the bridge circuit comprising:

a first branch having a first resistor of value R1, wherein the first resistor is coupled to a tunable resistor of value R at a first intermediate node;

a second branch having a second resistor of value R2, wherein the second resistor is coupled to a variable reference resistor of value Rref at a second intermediate node; and an amplifier having a positive input terminal coupled to the first intermediate node and a negative input terminal coupled to the second intermediate node, wherein the amplifier is configured to generate a digital voltage output at the output node as a function of the mechanical stress applied to the substrate and of the value Rref; and a microprocessor coupled to the variable reference resistor and to the output node, wherein the microprocessor is configured to:

control the variable reference resistor to sweep through a plurality of discrete values Rref; and read the digital voltage output at the output node, wherein the variable reference resistor is digitally controlled by the microprocessor to sweep through the plurality of discrete values Rref by increasing the value of Rref in an upward sweep from a first value to a second value and by decreasing the value Rref in a subsequent downward sweep from the second value to the first value so as toggle an output level of the digital voltage output, and wherein the bridge circuit is self-referenced so that the digital voltage output is fed back to the first and second branches at the output node.

21. The stress sensor system of claim 20, wherein the microprocessor is further configured to:

detect a first transition in the digital voltage output from a high level to a low level during the upward sweep and a second transition in the digital voltage output from the low level to the high level during the downward sweep.

22. The stress sensor system of claim 21, wherein the microprocessor is further configured to:

record a digital word representation of the value Rref corresponding to the detected first transition as a high toggle threshold value and a digital word representation of the value Rref corresponding to the detected second transition as a low toggle threshold value; and record a difference between the high toggle threshold value and the low toggle threshold value as a differential readout.

* * * * *